United States Patent
Kappanganthu et al.

(10) Patent No.: US 10,030,593 B2
(45) Date of Patent: Jul. 24, 2018

(54) SYSTEM AND METHOD FOR DETECTING AIR FUEL RATIO IMBALANCE

(71) Applicant: Cummins Inc., Columbus, IN (US)

(72) Inventors: Karthik Kappanganthu, Bloomington, IN (US); David Stroh, Columbus, IN (US); Carlos A. Lana, Columbus, IN (US); J. Stephen Wills, Columbus, IN (US)

(73) Assignee: Cummins Inc., Columbus, IN (US)

( * ) Notice: Subject to any disclaimer, the term of this patent is extended or adjusted under 35 U.S.C. 154(b) by 848 days.

(21) Appl. No.: 14/290,052

(22) Filed: May 29, 2014

(65) Prior Publication Data

US 2015/0345416 A1  Dec. 3, 2015

(51) Int. Cl.
  *F02D 41/00* (2006.01)
  *F02D 41/14* (2006.01)
  *G01M 15/00* (2006.01)

(52) U.S. Cl.
  CPC ....... *F02D 41/0085* (2013.01); *F02D 41/009* (2013.01); *F02D 41/0087* (2013.01); *F02D 41/1439* (2013.01); *F02D 41/1454* (2013.01); *G01M 15/00* (2013.01)

(58) Field of Classification Search
  CPC .................................................. F02D 41/1454
  USPC ......................................................... 701/109
  See application file for complete search history.

(56) References Cited

U.S. PATENT DOCUMENTS

| | | | | |
|---|---|---|---|---|
| 5,651,353 A | * | 7/1997 | Allston | ............... F02D 41/0085 123/673 |
| 6,314,952 B1 | * | 11/2001 | Turin | ................. F02D 41/0085 123/673 |
| 6,382,198 B1 | | 5/2002 | Smith et al. | |
| 7,024,302 B2 | * | 4/2006 | Mizuno | ................. F02D 41/008 701/109 |
| 7,802,563 B2 | * | 9/2010 | Behr | .................... F02D 41/0082 123/692 |
| 7,900,615 B2 | | 3/2011 | Wang et al. | |
| 8,190,351 B2 | * | 5/2012 | Fukuchi | .............. F02D 41/1498 701/104 |
| 8,249,794 B2 | | 8/2012 | Miyamoto et al. | |

(Continued)

OTHER PUBLICATIONS

European Search Report dated Jan. 4, 2016 in EP Application No. 15 16 9046, 7 pages.

*Primary Examiner* — Ruth Ilan

(74) *Attorney, Agent, or Firm* — Faegre Baker Daniels LLP

(57) ABSTRACT

A system and method of detecting fueling imbalance(s) in an internal combustion engine is provided. The method includes receiving data regarding an oxygen content of engine exhaust for the engine operating at a cycle rate. Frequency component analysis is performed comprising a filtering operation on the received oxygen content data. The filtering is done at the cycle rate of the engine or harmonics thereof to obtain filtered oxygen content data. Then, the method/system determines at least one of: 1) one or more angles of the engine at which the filtered oxygen content data exhibits a first amplitude value characteristic relative to amplitude values at other angles; and 2) a shape of the filtered oxygen content data obtained by sampling at predefined engine angles. The method/system then identifies a cylinder experiencing a fueling imbalance responsive to the determined at least one of one or more angle(s) and shape of the data.

29 Claims, 4 Drawing Sheets

(56) References Cited

U.S. PATENT DOCUMENTS

| | | | |
|---|---|---|---|
| 8,285,469 B2 | 10/2012 | Sano et al. | |
| 8,302,581 B2 | 11/2012 | Nishikiori et al. | |
| 8,370,043 B2 | 2/2013 | Kidokoro et al. | |
| 8,401,765 B2 | 3/2013 | Iwazaki et al. | |
| 8,401,766 B2 | 3/2013 | Iwazaki et al. | |
| 8,433,499 B2 | 4/2013 | Otsuka et al. | |
| 8,443,656 B2 | 5/2013 | Hakariya et al. | |
| 8,447,497 B2 | 5/2013 | Iwazaki et al. | |
| 8,452,517 B2 | 5/2013 | Sawada et al. | |
| 8,452,521 B2 | 5/2013 | Iwazaki et al. | |
| 8,483,900 B2 | 7/2013 | Irisawa | |
| 8,489,312 B2 | 7/2013 | Dulzo et al. | |
| 8,509,984 B2 | 8/2013 | Kidokoro et al. | |
| 8,510,017 B2 | 8/2013 | Sawada et al. | |
| 8,560,208 B2* | 10/2013 | Miyamoto | F02D 41/0065 123/434 |
| 8,577,645 B2* | 11/2013 | Turin | F02D 41/0085 702/183 |
| 8,670,917 B2* | 3/2014 | Aoki | F02D 41/1454 123/673 |
| 8,694,226 B2* | 4/2014 | Kurahashi | F02D 41/0085 701/103 |
| 9,115,661 B2* | 8/2015 | Iwazaki | F02D 41/1441 |
| 9,453,782 B2* | 9/2016 | Qiao | G01M 15/104 |
| 9,523,318 B2* | 12/2016 | Miyauchi | F02D 41/0085 |
| 2006/0271270 A1* | 11/2006 | Chauvin | F02D 41/008 701/109 |
| 2006/0271271 A1* | 11/2006 | Chauvin | F02D 41/008 701/109 |
| 2011/0153181 A1* | 6/2011 | Bagnasco | F01L 13/00 701/109 |
| 2013/0060449 A1* | 3/2013 | Bagnasco | F02D 41/0085 701/103 |
| 2013/0131962 A1 | 5/2013 | Sekiguchi et al. | |
| 2013/0253802 A1 | 9/2013 | Miyamoto et al. | |
| 2013/0268177 A1* | 10/2013 | Wu | F02D 41/0085 701/103 |
| 2013/0275024 A1* | 10/2013 | Nakagawa | F02D 41/1441 701/102 |

* cited by examiner

SYSTEM AND METHOD FOR DETECTING AIR FUEL RATIO IMBALANCE

FIELD OF THE DISCLOSURE

The present invention relates generally to systems for controlling internal combustion engines, and more specifically to systems for detecting and controlling cylinder-to-cylinder imbalances in internal combustion engines.

BACKGROUND

In an internal combustion engine it is generally necessary to control a mixing ratio of air and fuel in a mixed gas burned in the internal combustion engine to control the air-fuel ratio. Such control provides efficient catalytic purification of hazardous components present in the exhaust gas. If exactly enough air is provided to completely burn all of the fuel, the ratio is known as the stoichiometric mixture. In order to perform such control of air-fuel ratio, an air-fuel ratio sensor is provided in an exhaust gas passage of the internal combustion engine and feedback control is implemented such as to match the air-fuel ratio detected by the sensor with a predetermined target air-fuel ratio.

In a multi-cylinder internal combustion engine, the air-fuel ratio control is usually performed by using the same control amount for all of the cylinders. Therefore, the actual air-fuel ratio can vary between the cylinders even when the air-fuel ratio control is implemented. Furthermore, while the fueling provided to each cylinder can be adjusted and controlled to be the same across cylinders, other factors can contribute to cause inconsistencies between the cylinders. Such other factors include things such as charge (air+any recirculated exhaust) composition, start of injection timing, and cylinder/piston geometry.

Such inter-cylinder imbalances have the potential to cause torque pulsations, reduce efficiency, and increase emissions and component wear.

What is therefore needed is a system for detecting inter-cylinder imbalances and then taking affirmative steps to reduce the imbalances.

DETAILED DESCRIPTION

Figure 1:
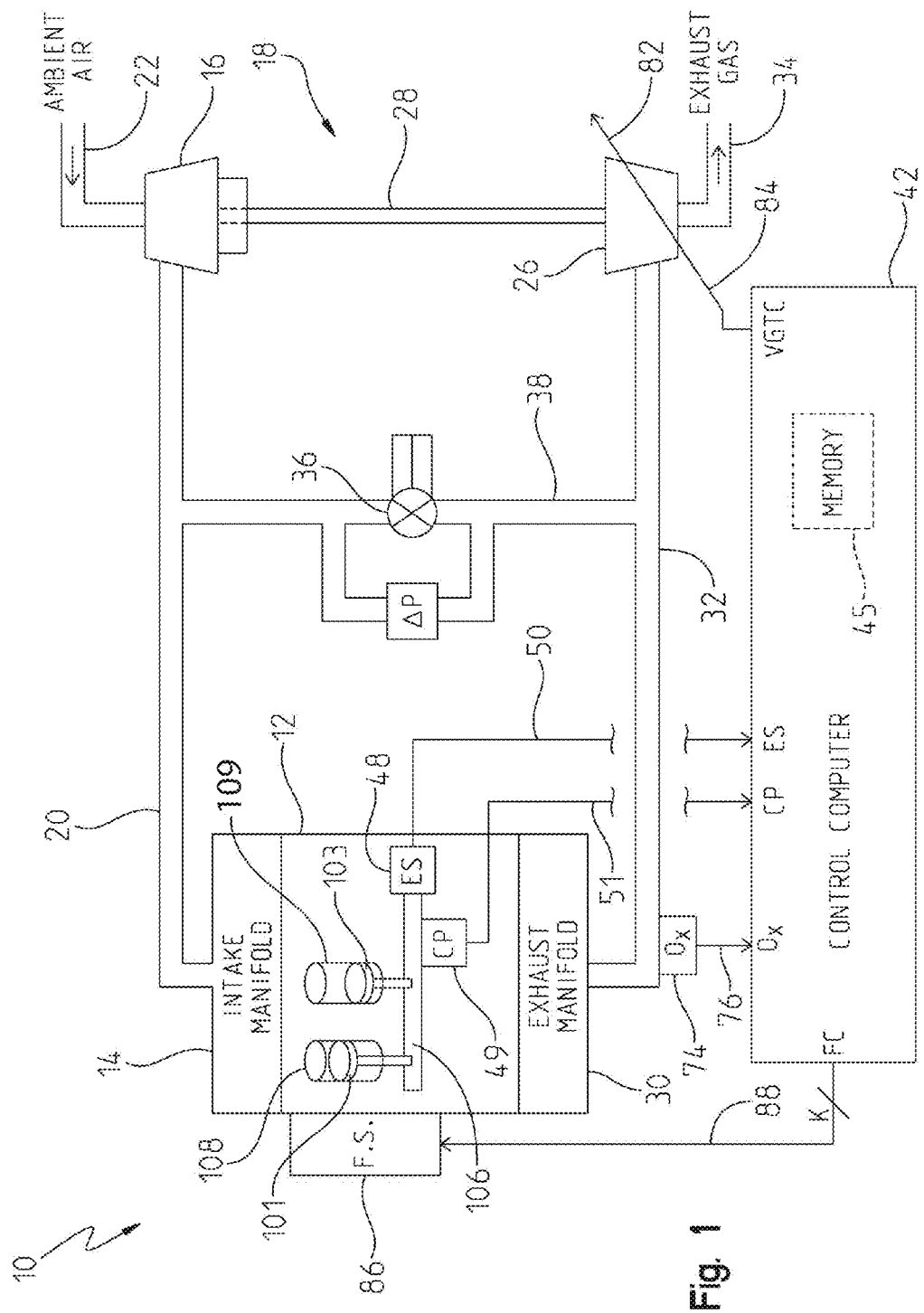
FIG. 1 is a diagram of one illustrative embodiment of a system for controlling inter-cylinder imbalances.

For the purposes of promoting an understanding of the principles of the invention, reference will now be made to a number of embodiments illustrated in the drawings and specific language will be used to describe the same. It will nevertheless be understood that no limitation of the scope of the invention is thereby intended.

Briefly, in one example, a method of detecting a fueling imbalance in an internal combustion engine is provided. The method includes receiving data regarding an oxygen content of engine exhaust for the engine operating at a cycle rate. The method also includes performing frequency component analysis comprising a filtering operation on the received oxygen content data. The filtering is done at the cycle rate of the engine or harmonics thereof to obtain filtered oxygen content data. Then, the method determines at least one of: 1) one or more angles of the engine at which the filtered oxygen content data exhibits a first amplitude value characteristic relative to amplitude values at other angles; and 2) a shape of the filtered oxygen content data obtained by sampling at pre-defined engine angles. The method then identifies a cylinder experiencing a fueling imbalance responsive to the determined at least one of one or more angle(s) and shape of the data.

In another example, a device for detecting a fueling imbalance in an internal combustion engine is provided including: an oxygen sensor operable to detect oxygen content in engine exhaust of the engine operating at a cycle rate; a frequency analyzer operable to receive data from the oxygen sensor and filter the received data at one or more frequencies taken from the group consisting the cycle rate of the engine and harmonics thereof to obtain filtered oxygen content data; at least one of: 1) an angle determiner operable to determine one or more angles of the engine at which the filtered oxygen content data exhibits a first amplitude value characteristic relative to amplitude values at other angles; 2) a shape analyzer operable to determine a shape of a curve defined by the filtered oxygen content data obtained by sampling at pre-defined engine angles; and an imbalance detector operable to determine a cylinder experiencing a fueling imbalance responsive to an output from at least one of the angle determiner and the shape analyzer.

In yet another example, an engine control module is provided including memory having non transitory instructions thereon that when interpreted by the engine control module cause the module to: receive data regarding oxygen content of engine exhaust of the engine operating at a cycle rate; perform frequency component analysis comprising a filtering operation on the received oxygen content data at one or more frequencies taken from the group consisting of the cycle rate of the engine and harmonics thereof to obtain filtered oxygen content data; determine at least one of: 1) one or more angles of the engine at which the filtered oxygen content data exhibits a first amplitude value characteristic relative to amplitude values at other angles; and 2) a shape of the filtered oxygen content data obtained by sampling at pre-defined engine angles; and identify a cylinder experiencing a fueling imbalance responsive to the determined at least of one or more angle(s) and shape of the data.

Referring now to FIG. 1, a diagram of one illustrative embodiment of a system 10 for controlling inter-cylinder imbalances in an internal combustion engine is shown. System 10 includes an internal combustion engine 12 having an intake manifold 14 illustratively fluidly coupled to an outlet of a compressor 16 of a turbocharger 18 via an intake conduit 20, wherein the compressor 16 includes a compressor inlet coupled to an intake conduit 22 for receiving fresh ambient air therefrom. The turbocharger compressor 16 is mechanically and rotatably coupled to a variable geometry turbocharger turbine 26 via a drive shaft 28, wherein turbine 26 includes a turbine inlet fluidly coupled to an exhaust manifold 30 of engine 12 via an exhaust conduit 32, and further includes a turbine outlet fluidly coupled to ambient via an exhaust conduit 34. An EGR valve 36 is disposed in-line with an EGR conduit 38 fluidly coupled at one end to the intake conduit 20 and an opposite end to the exhaust conduit 32. Engine 12 illustratively includes a plurality of cylinders including first cylinder 108 and second cylinder 109. First and second cylinders 108, 109 include respective first and second pistons 101, 103 driven by crankshaft 106. It should be appreciated that cylinders 108, 109; pistons 101, 103; and crankshaft 106 operate in a known manner such that controlled ignition of fuel within cylinders 108, 109 imparts pressure to pistons 101, 103 that cause the rotation of crankshaft 106. Crankshaft 106 passes through 360-degrees of rotational travel.

The rotational position (angular position) of crankshaft 106 is defined by establishing an arbitrary 0-degree position and then defining the rotational position of crankshaft 106 relative to that 0-degree position (CP). Accordingly, after travelling half a rotation from the 0-degree position, crankshaft 106 would be considered to be located at the 180-degree position. A full set of cycles of the engine (a four-stroke engine) involves two full rotations of the crankshaft. Thus, over a full set of cycles, the crankshaft travels (rotates) 720 degrees. Accordingly, an "engine angle" is defined by the position of the crankshaft as well as which rotation (of two) of the engine is experiencing. Accordingly, the engine angle is defined as an angle between zero and 720-degrees where the first 360 degrees represent the first rotation of the crankshaft and angles 360-720 represent the second rotation of the crankshaft. Sensor 49 illustratively detects the rotational crankshaft position (CP) and outputs a signal indicative of the rotational position on signal path 51. Sensor 49 is illustratively an angle determiner with respect to the crankshaft position. This signal is used along with other inputs to determine the engine angle. Accordingly, control computer 42, discussed below, receives such inputs and also includes logic blocks that are angle determiners that are operable to determine the engine angle.

System 10 includes a control computer 42 that is generally operable to control and manage the overall operation of engine 12. Control computer 42 includes a memory unit 45 as well as a number of inputs and outputs for interfacing with various sensors and systems coupled to engine 12. Control computer 42 is, in one embodiment, microprocessor-based and may be a known control unit sometimes referred to as an electronic or engine control module (ECM), electronic or engine control unit (ECU) or the like, or may alternatively be a general purpose control circuit capable of operation as will be described hereinafter. In any case, control computer 42 includes one or more control algorithms, as will be described in greater detail hereinafter, for controlling inter-cylinder imbalances.

Control computer 42 includes a number of inputs for receiving signals from various sensors or sensing systems associated with system 10. For example, system 10 includes an engine speed sensor 48 electrically connected to an engine speed input, ES, of control computer 42 via signal path 50. Engine speed sensor 48 is operable to sense rotational speed of the engine 12 (of crankshaft 106) and produce a corresponding engine speed signal on signal path 50 indicative of engine rotational speed. In one embodiment, sensor 48 is a Hall effect sensor operable to determine engine speed by sensing passage thereby of a number of equi-angularly spaced teeth formed on a gear or tone wheel. Alternatively, engine speed sensor 48 may be any other known sensor operable as just described including, but not limited to, a variable reluctance sensor or the like.

System 10 may further includes an engine exhaust parameter sensor 74 disposed in fluid communication with exhaust conduit 32 and electrically connected to an engine exhaust parameter input, Ox, of control computer 42 via signal path 76, as shown in FIG. 1. Engine exhaust parameter sensor 74 is illustratively an oxygen sensor that provides an indication of the oxygen content of the exhaust. Alternatively, sensor 74 may be disposed in direct communication with the exhaust manifold 30. In either case, sensor 74 is operable to provide a signal on signal path 76 indicative of the exhaust gas produced by engine 12.

Control computer 42 also includes a number of outputs for controlling one or more engine functions associated with system 10.

System 10 further optionally includes turbine 26, part of a variable geometry turbocharger (VGT) mechanism, shown generally as 82, that is responsive to VGT control signal VGTC from control computer 42. The VGT mechanism 82 may be embodied as any combination of a mechanical or electromechanical mechanism controllable in a known manner to modify the effective geometry of the turbocharger turbine 26. Control computer 42 is accordingly operable to control VGT 82 in a known manner to selectively control the swallowing capacity and/or efficiency of the turbocharger 18.

System 10 further includes a fuel system 86 electrically connected to a fuel command output, FC, of control computer 42 via a number, K, of signal paths 88 wherein K may be any positive integer. Fuel system 86 is responsive to fueling commands, FC, produced by control computer 42 to supply fuel to engine 12 in a known manner. In one example, K, is equal to the number of cylinders of engine 12. Thus, in the present example, K is at least two such that each cylinder 108, 109 is able to be independently fueled via a control signal along its own signal path 88.

Figure 2:
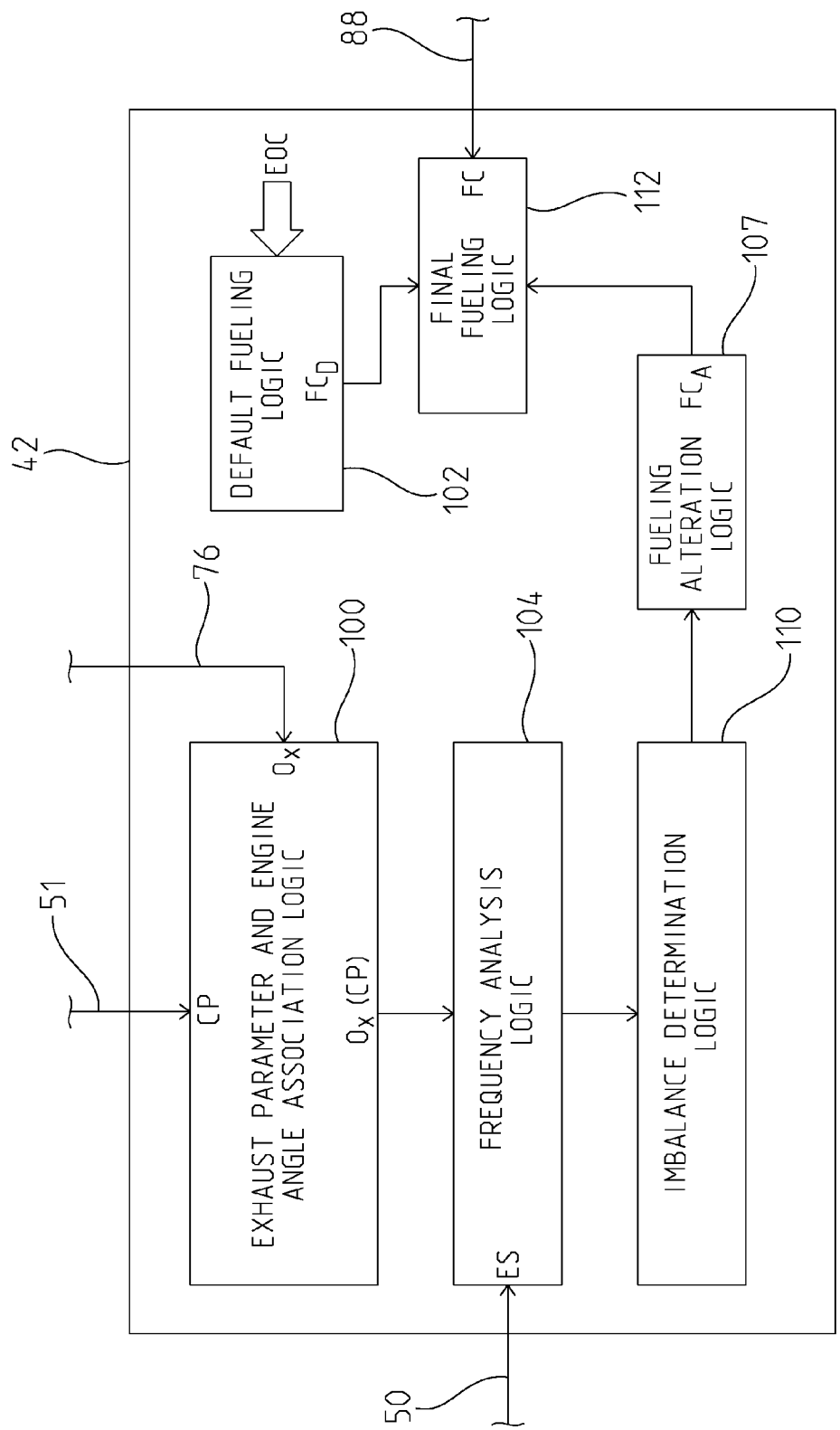
FIG. 2 is a block diagram of one illustrative configuration of some of the internal features of the control computer of FIG. 1 as they relate to controlling inter-cylinder imbalances.
Figure 3:
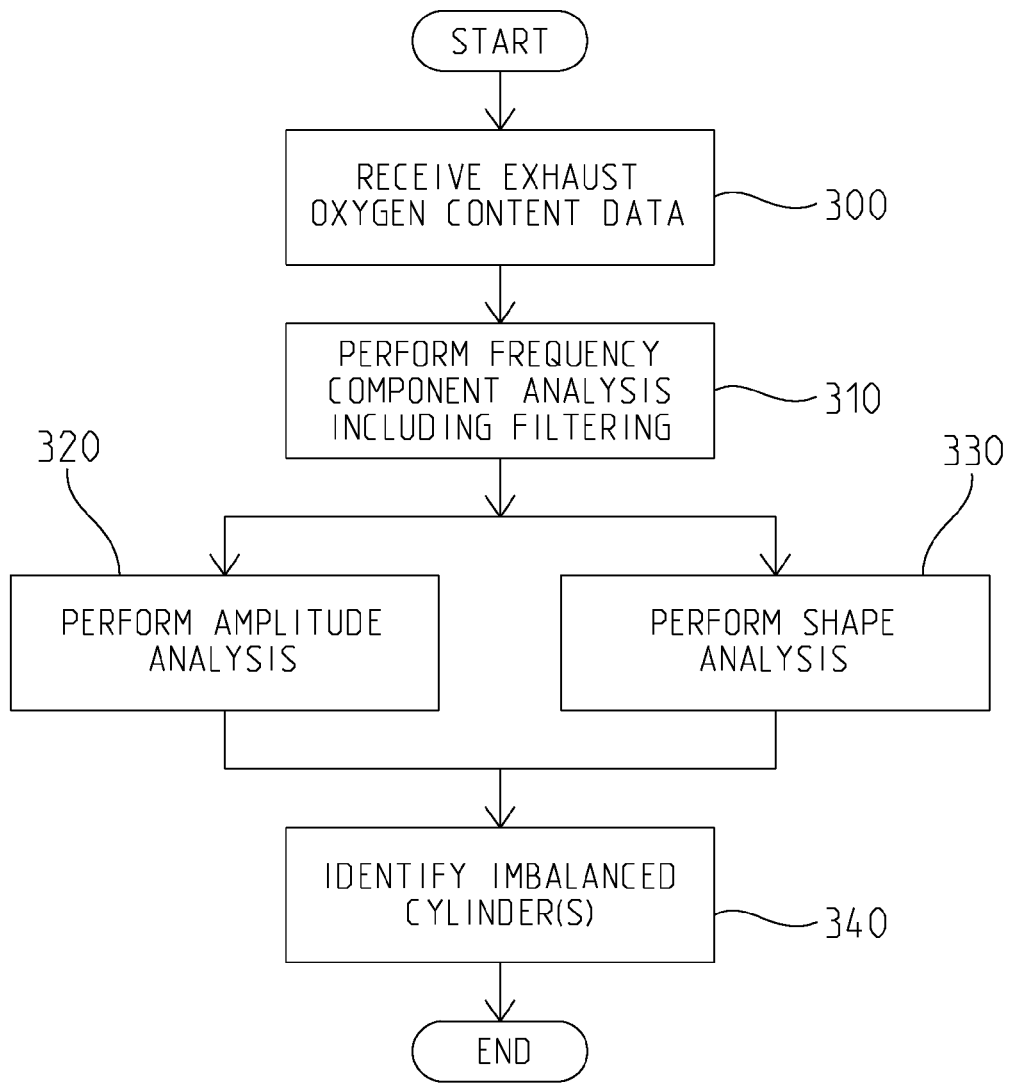
FIG. 3 is a flow chart illustrative of operation the logic blocks of the control computer of FIG. 2.

Referring now to FIG. 2, a block diagram of one illustrative configuration of some of the internal features of the control computer 42 of FIG. 1, as they relate to controlling cylinder imbalances, is shown. Control computer 42 includes a default fueling logic block 102 receiving as inputs a number of engine operating condition values, EOC, including, for example, engine speed and other engine operating parameters, as is known in the art. Block 102 is responsive to the number of engine operating condition values, EOC, to determine a number of fueling parameters, including a mass fuel flow rate value and a start-of-fuel injection timing value, and to compute the default fueling command, $FC_D$, as a function of these various fueling parameters, all in a manner well known in the art. The default fueling logic block 102 is operable to provide the fueling command, $FC_D$, to final fueling logic block 112.

Exhaust parameter and engine angle association logic block 100 has a crankshaft position input, CP, (or engine position input) receiving the crankshaft position signal on signal path 51 and an exhaust parameter signal, illustratively oxygen content, Ox, on path 76, block 300. The exhaust parameter and engine angle association logic block 100 is operable, as will be more fully described hereinafter, to determine the exhaust parameter, Ox, receive the crankshaft position data, CP, and to associate the two inputs such that there is a logical association therebetween. It should be appreciated that the associating may include processing such as applying a time offset to one signal (such as exhaust parameter) in recognition that any effect that engine angle may have on exhaust may be delayed due to the exhaust sensor being downstream from the cylinders or the sensor has associated delay and dynamic characteristics in measuring the exhaust parameter or that changes to the exhaust are generally reactive to engine angle. In some embodiments, the engine speed (ES) is used to determine the association. In other embodiments, the change in the crankshaft position signal (dCP) is used as an indication of engine speed.

Accordingly, the association may be one of a static offset applied to one input, a varying offset applied to an input, or otherwise. Regardless of how the association is made, once properly associated (calibrated) the associated signal (Ox (CP)) is provided at output, Ox(CP), of block 100. Signal Ox(CP) is illustratively a set of values containing an exhaust oxygen content value and associated engine angle that generated the associated exhaust oxygen content value.

Control computer 42 further includes a frequency analysis logic block 104 (a "frequency analyzer") having inputs receiving the associated signal, Ox(CP), and engine speed, ES. It should be appreciated that while certain inputs are described as going to block 100 and being processed prior to being provided to block 104, certain embodiments are envisioned where the functions of each of blocks 100, 104 are combined into a single block and/or certain functionalities are shared and/or moved between the two blocks. The groupings of various functionalities in blocks is meant to be exemplary only and not limiting. In one embodiment, the frequency analysis logic block 104 is configured, as will be described in greater detail hereinafter, to produce one or more output signals, as a function of at least some of its input variables for forwarding to imbalance determination logic 110. Frequency analysis logic block 104 performs frequency analysis on the associated signal Ox(CP), block 310. In one embodiment, frequency analysis logic block 104 determines the cycle frequency of the engine from the engine speed signal. Frequency analysis logic block 104 then filters the associated signal Ox(CP) at the cycle frequency. In other embodiments, the associated signal Ox(CP) is filtered at a harmonic frequency of the cycle frequency. In one embodiment, this filtering is carried out via a band filter, such as a notch filter. This analysis provides (filtered) frequency component data regarding the relationship between the exhaust component and the engine angle. In one embodiment, the frequency component data is processed to produce root mean squared data and/or amplitude data of the filtered oxygen content data.

Figure 4:
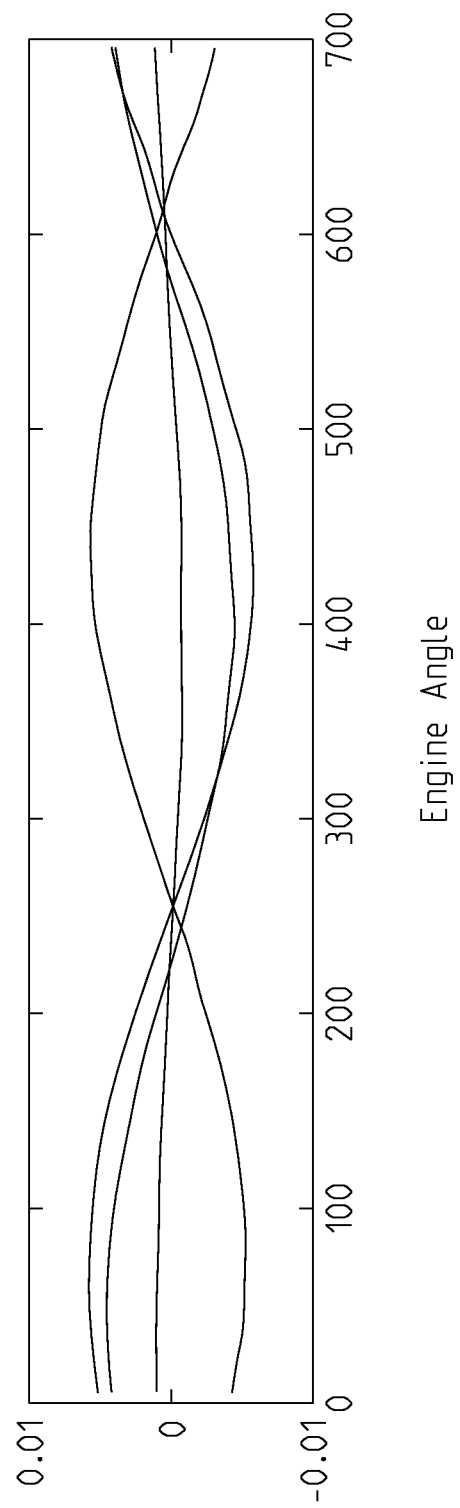
FIG. 4 is an illustrative graphical representation of frequency component data utilized by the control computer of FIG. 1.

This frequency component data is then output. FIG. 4 shows an exemplary illustration of one embodiment of the output frequency component data. It should be appreciated that the graphical nature of FIG. 4 is provided for ease of comprehension. FIG. 4 actually shows four "curves" representing four sets of measurements. Control computer 42 need not produce such a graphical representation. In one embodiment, the root mean squared data is compared to a threshold and further processing thereof is conditionally performed based upon the root mean squared data having a value greater than a threshold. Further, embodiments are envisioned where a running average of the root mean squared data over a defined time period (or number of cycles) is used and compared to a threshold rather than instantaneous values.

Control computer 42 further includes an imbalance determination logic block 110 receiving the frequency component data from logic block 104. The imbalance determination logic block 110 is configured to process the received frequency component data and determine whether an imbalance between cylinders 108, 109 is indicated thereby (an "imbalance detector"). Imbalance determination logic block 110 further operates as a variance analyzer operable to produce a statistical measure of the magnitude of varying in the filtered exhaust parameter data. In a first embodiment, the frequency component data is analyzed to determine amplitude characteristics thereof, block 320. In some embodiments, the frequency component data is analyzed to determine the point having the greatest amplitude or least amplitude among the data points. Still further, the frequency component data may be analyzed to determine where the amplitude is zero (or within a threshold distance of zero, or the closest to zero of the data points). The analysis provides one or more engine angles along with amplitude data from the frequency component data. The determined point(s) is then used to identify one or more cylinders that are experiencing an imbalance, block 340. It should be appreciated that while only two cylinders are shown in FIG. 1, engines 12 often have more (4, 6, 8, 10, 12, etc.) such that many of the cylinders can be balanced while one or more is imbalanced relative to the others.

The identification of the one or more cylinders is illustratively achieved by comparing the determined points to a lookup table that associates the provided angle to one or more cylinders. Alternatively, a formula or other manner of correlating the engine angle to a cylinder is utilized. It should be appreciated that such a table or formula is obtained by experimentation where imbalances are purposefully introduced and their effect on the exhaust parameter is noted. In one embodiment correlating the engine angle to a cylinder imbalance pattern is achieved by actively varying the fuelling in each cylinder and determining the points that are most sensitive to the observed amplitude. In order to obtain better signal to noise characteristics, fuel can be varied at specific frequencies and the sensitivity to the output at the same frequency can be determined. Further, some of the cylinders can be disabled while performing this test to further improve the signal to noise ratio. In the present illustrative example, the amplitude of the data is indicative of the severity of imbalance. In one embodiment, the amplitude of the data is compared to a threshold. Further processing of the data is conditionally performed based upon the maximum amplitude having a value greater than a threshold.

According to a second embodiment, the imbalance determination logic block 110 the frequency component data received from frequency analysis logic block 104 is processed to perform shape analysis on the curve provided by the data, block 330. Shape analysis is illustratively a form of pattern matching. In a first embodiment of shape analysis, such shape analysis is one of comparing the curve to one or more reference curves and obtaining a root mean squared value that describes the cumulative differences therebetween or a dot product to describe the similarity between them. In a second embodiment of shape analysis, such shape analysis utilizes a neural network type application to associate the frequency component data with a cylinder experiencing an imbalance. In one embodiment, shape analysis is performed by sampling the provided data at pre-defined engine angles. Again, the shape analysis application is trained by providing examples of balanced and imbalanced frequency component data. Other embodiments for the shape analysis include use of linear discriminant analysis and support vector machines to transform the signal appropriately and then identify the imbalance pattern. In one embodiment, the pattern matching produces a value indicative of the degree of matching for the shape of the filtered exhaust parameter content data and further processing is conditionally performed based upon the degree of matching having a value greater than a threshold. Having determined the cylinder(s) experiencing the imbalance and the severity of the imbalance, this data is output from imbalance determination logic 110 to fueling alteration logic block 107.

Fueling alteration logic block 107 receives the data regarding the imbalance and determines fueling alterations to reduce and/or eliminate the imbalance. It should be appreciated that in some embodiments, the fueling alteration logic block 107 employs a threshold test such that if the severity of the imbalance is small or below the threshold, no corrective action is taken. In those embodiments and/or situations where the provided imbalance data calls for alteration of the fueling, fueling alteration values (FCA) are output from fueling alteration logic block 107 to second cylinder 109.

Final fueling logic block 112 receives $FC_D$ and $FC_A$ and determines (such as by adding) the final fueling command (FC) which is output via signal paths 88 to fuel system 86. The fueling system 86 is responsive to the fueling command, FC, to supply fuel to engine 12 as described hereinabove.

For any value that is described herein as being measured off of engine 12, it should be appreciated that such value may be estimated or calculated instead of directly measured by various ways known in the art.

The above detailed description and the examples described therein have been presented for the purposes of illustration and description only and not for limitation. For example, the operations described may be done in any suitable manner. The method steps may be done in any suitable order still providing the described operation and results. It is therefore contemplated that the present embodiments cover any and all modifications, variations or equivalents that fall within the spirit and scope of the basic underlying principles disclosed above and claimed herein.

What is claimed is:

1. A method of detecting a fueling imbalance in an internal combustion engine including:
   providing a system comprising a control computer having non transitory instructions thereon, and at least one sensor for determining oxygen content of engine exhaust;
   receiving, by the control computer, data from the at least one sensor regarding the oxygen content of engine exhaust for the engine operating at a cycle rate;
   performing, by the control computer, frequency component analysis comprising a filtering operation on the received oxygen content data at one or more frequencies taken from the group consisting of the cycle rate of the engine and harmonics thereof to obtain filtered oxygen content data;
   determining, by the control computer, at least one of:
   1) one or more angles of the engine at which the filtered oxygen content data exhibits a first amplitude value characteristic relative to amplitude values at other angles; and
   2) a shape analysis of the filtered oxygen content data obtained by sampling at pre-defined engine angles; and
   identifying, by the control computer, a cylinder experiencing a fueling imbalance responsive to the determined at least one of one or more angle(s) and shape of the data.

2. The method of claim 1, further including processing, by the control computer, the filtered oxygen content to obtain at least one of root mean squared data and amplitude data of the filtered oxygen content data.

3. The method of claim 2, further including comparing, by the control computer, the root mean squared data to a threshold and the determining and identifying are conditionally performed based upon the root mean squared data having a value greater than the threshold.

4. The method of claim 1, wherein identifying a cylinder experiencing a fueling imbalance includes comparing, by the control computer, the determined angles and associated amplitude to a table of such values to identify a cylinder.

5. The method of claim 1, wherein identifying a cylinder experiencing a fueling imbalance includes conducting, by the control computer, pattern matching analysis on the determined shape of the filtered oxygen content data.

6. The method of claim 5, wherein the pattern matching is performed, by the control computer, using a model selected from the group of linear discriminant analysis and support vector machines.

7. The method of claim 5, wherein the pattern matching produces a value indicative of the degree of matching for the shape of the filtered oxygen content and the determining and identifying are conditionally performed based upon the degree of matching value having a value greater than a threshold.

8. The method of claim 1, further including issuing, by the control computer, a corrective fueling command to the identified cylinder.

9. The method of claim 1, further including:
   identifying, by the control computer, a maximum amplitude value of the filtered oxygen data; and
   comparing, by the control computer, the maximum amplitude to a threshold, the determining and identifying being conditionally performed based upon the maximum amplitude having a value greater than a threshold.

10. The method of claim 1, wherein the first amplitude value characteristic is defined as one or more of greatest amplitude, least amplitude, and closest to zero amplitude.

11. The method of claim 1, wherein the step of identifying, by the control computer, the cylinder experiencing a fueling imbalance responsive to the determined at least one of one or more angle(s) and shape of the data is determined by comparing the at least one of one or more angle(s) and shape of the data to data obtained by
   selectively operating, by the control computer, less than all available cylinders such that the received exhaust oxygen content data reflects oxygen content resulting from times when less than all available cylinders are operating.

12. The method of claim 1, wherein the step of identifying, by the control computer, the cylinder experiencing a fueling imbalance responsive to the determined at least one of one or more angle(s) and shape of the data is determined by comparing the at least one of one or more angle(s) and shape of the data to data obtained by modifying, by the computer controller, fueling in a first cylinder such that corresponding changes in the filtered oxygen content data are noted to identify a correlation between imbalance and the filtered oxygen content data.

13. The method of claim 1 further including determining, by the control computer, whether a corrective action is necessary in response to data regarding the fueling imbalance of the identified cylinder, wherein the step of determining whether the corrective action is necessary includes comparing a severity of the fueling imbalance to a threshold value.

14. A device for detecting a fueling imbalance in an internal combustion engine including:
   an oxygen sensor operable to detect oxygen content in engine exhaust of the engine operating at a cycle rate;
   a frequency analyzer operable to receive data from the oxygen sensor and filter the received data at one or more frequencies taken from the group consisting the cycle rate of the engine and harmonics thereof to obtain filtered oxygen content data;
   at least one of:

1) an angle determiner operable to determine one or more angles of the engine at which the filtered oxygen content data exhibits a first amplitude value characteristic relative to amplitude values at other angles; and
2) a shape analyzer operable to determine a shape of a curve defined by the filtered oxygen content data obtained by sampling at pre-defined engine angles; and an imbalance detector operable to determine a cylinder experiencing a fueling imbalance responsive to an output from at least one of the angle determiner and the shape analyzer.

15. The device of claim 14, further including a variance analyzer operable to produce a statistical measure of the magnitude of varying filtered oxygen content data.

16. The device of claim 15, wherein the variance analyzer performs a root mean square calculation on the filtered oxygen content data.

17. The device of claim 14, wherein the imbalance detector identifies a cylinder experiencing a fueling imbalance by comparing the determined angles and associated amplitude to a table of such values.

18. The device of claim 14, wherein the imbalance detector identifies a cylinder experiencing a fueling imbalance by conducting pattern matching analysis on the determined shape of the filtered oxygen content data.

19. The device of claim 14, further including a fueling command module that issues a fueling command responsive to a fueling imbalance signal issued by the imbalance detector.

20. The device of claim 14, wherein the first amplitude value characteristic is defined as one or more of greatest amplitude, least amplitude, and zero amplitude.

21. The device of claim 14 further including a fueling alteration module operable to determine whether a corrective action is necessary in response to data regarding the fueling imbalance of the determined cylinder, wherein the fueling alteration module compares a severity of the fueling imbalance to a threshold value to determine whether the corrective action is necessary.

22. An engine control module including memory having non transitory instructions thereon that when interpreted by the engine control module cause the module to:
   receive data regarding oxygen content of engine exhaust of an engine operating at a cycle rate;
   perform frequency component analysis comprising a filtering operation on the received oxygen content data at one or more frequencies taken from the group consisting of the cycle rate of the engine and harmonics thereof to obtain filtered oxygen content data;
   determine at least one of:
      1) one or more angles of the engine at which the filtered oxygen content data exhibits a first amplitude value characteristic relative to amplitude values at other angles; and
      2) a shape of the filtered oxygen content data obtained by sampling at pre-defined engine angles; and
   identify a cylinder experiencing a fueling imbalance responsive to the determined at least of one or more angle(s) and shape of the data.

23. The control module of claim 22, wherein the instructions further cause the module to output a fueling command responsive to the identification of the cylinder experiencing a fueling imbalance.

24. The control module of claim 22, wherein the instructions further cause the module to produce a statistical measure of the magnitude of variance in the filtered oxygen content data.

25. The control module of claim 22, wherein the instructions further cause the module to compare the determined angles and associated amplitude to a table of such values to identify the cylinder experiencing a fueling imbalance.

26. The control module of claim 22, wherein the instructions further cause the module to identify the cylinder experiencing a fueling imbalance by conducting a pattern matching analysis on the determined shape of the filtered oxygen content data.

27. The control module of claim 22, the first amplitude value characteristic is defined as one or more of greatest amplitude, least amplitude, and zero amplitude.

28. The engine control module of claim 22, wherein the instructions further cause the module to determine whether a corrective action is necessary in response to data regarding the fueling imbalance of the identified cylinder, the determination including the instructions to further cause the module to compare a severity of the fueling imbalance to a threshold value.

29. A method of detecting a fueling imbalance in an internal combustion engine including:
   providing a system comprising a control computer having non transitory instructions thereon, and at least one sensor for determining oxygen content of engine exhaust;
   receiving, by the control computer, data from the at least one sensor regarding the oxygen content of engine exhaust for the engine operating at a cycle rate;
   performing, by the control computer, frequency component analysis comprising a filtering operation on the received oxygen content data at one or more frequencies taken from the group consisting of the cycle rate of the engine and harmonics thereof to obtain filtered oxygen content data;
   determining, by the control computer, at least one of:
      1) one or more angles of the engine at which the filtered oxygen content data exhibits a first amplitude value characteristic relative to amplitude values at other angles; and
      2) a shape analysis of the filtered oxygen content data obtained by sampling at pre-defined engine angles;
   identifying, by the control computer, a cylinder experiencing a fueling imbalance responsive to the determined at least one of one or more angle(s) and shape of the data; and
   issuing, by the control computer, a corrective fueling command to the identified cylinder.

* * * * *